Nov. 13, 1956     I. C. SCHULTZ     2,770,385
OUTLET BOX

Filed April 1, 1955     2 Sheets-Sheet 1

INVENTOR.
IGNATIUS C. SCHULTZ,
BY

McMorrow, Berman + Davidson
ATTORNEYS.

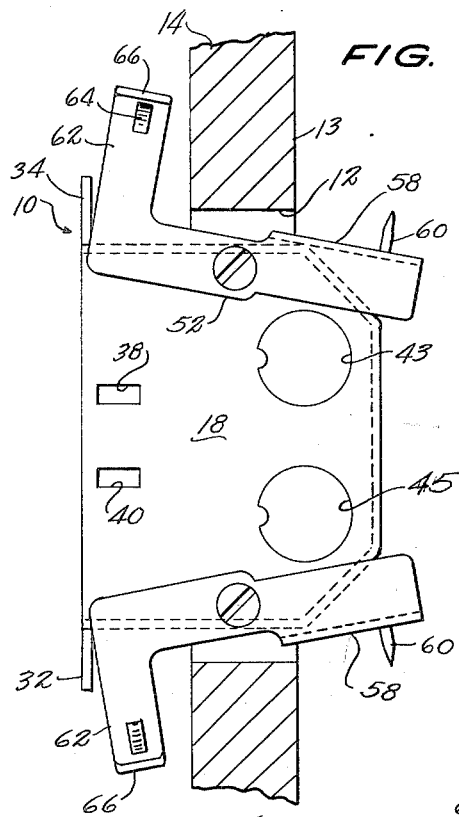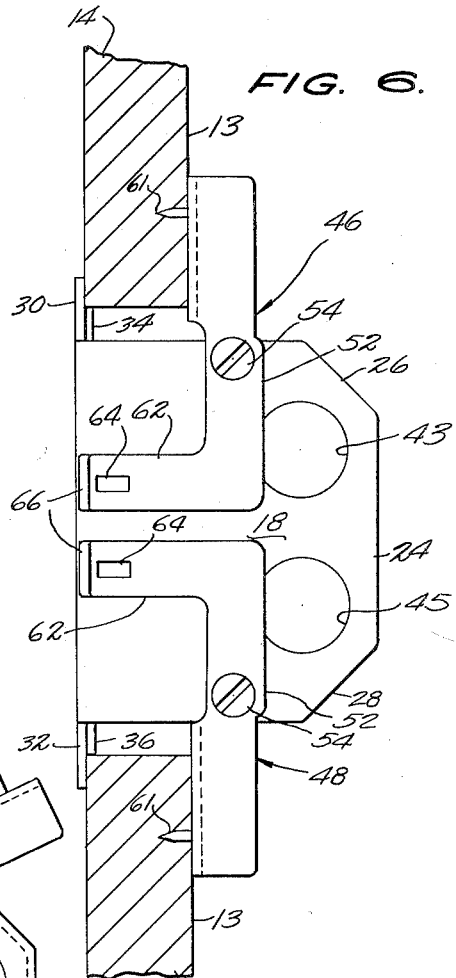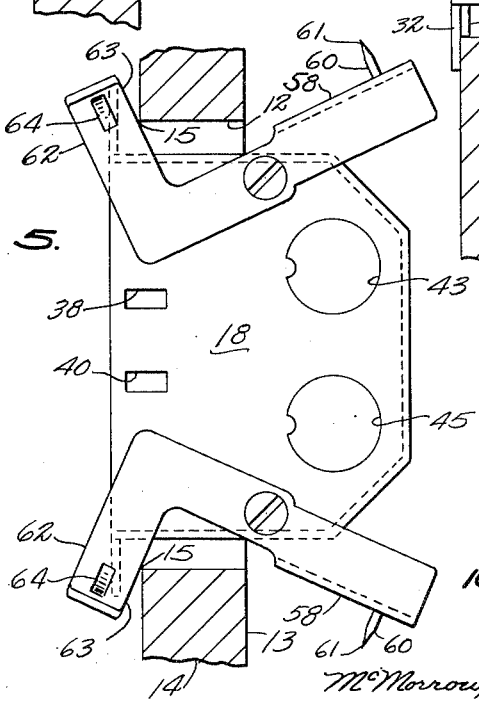

ved Nov. 13, 1956

2,770,385
OUTLET BOX

Ignatius C. Schultz, Conshohocken, Pa.

Application April 1, 1955, Serial No. 498,719

5 Claims. (Cl. 220—3.6)

This invention relates to an improved electrical outlet box, and more particularly to an outlet box having improved means for anchoring the box in an opening in a wall.

It is the primary object of this invention to provide an output box which incorporates improved means for securing the box in a wall opening without the use of separate fastening means, such as screws or bolts, as necessary with conventional types of outlet boxes.

It is a further object of this inveniton to provide an outlet box for electrical conduits which may be readily lockingly clamped in the desired position without danger of becoming loose or shifting within the wall opening, and which may, if desired, be released to permit intentional removal of the box.

Yet another object of this invention is to provide an outlet box which will materially reduce the installation time required in the placement of the outlet box in the wall openings, and thereby reduce the cost of installation.

Still another object of this invention is to provide an outlet box of the character indicated above which is of simple, yet rugged construction, which lends itself to mass production so as to be capable of production at low unit cost.

In carrying out the above objects, the invention embodies amongst its features, clamping means carried by the opposite side walls of the box movable in arcuate paths in the same plane adjacent opposite ends of the side walls and movable externally of the box so that after the box has been inserted in a suitably made opening in a wall, the clamping means may be moved to clamping engagement against the back of a wall, and anchoring means carried by the clamping means to engage the back of the wall to prevent accidental removal or shifting of the box after installation, and further means whereby the clamping means is locked in clamping position against the back of the wall.

Other objects and advantages will become apparent from a consideration of the following detailed description, forming the specification, and taken in conjunction with the accompanying drawings, in which:

Figure 4 is a side elevational and sectional view showing the outlet box being inserted into an opening in the wall to which it is to be secured;

Figure 5 is a view, similar to Figure 4, but showing the box further inserted into the wall opening with the clamping means moved and engaging the front side of the wall adjacent the opening; and Figure 6 is a view similar to Figure 5 showing the box fully installed in the wall opening.

Figure 1:
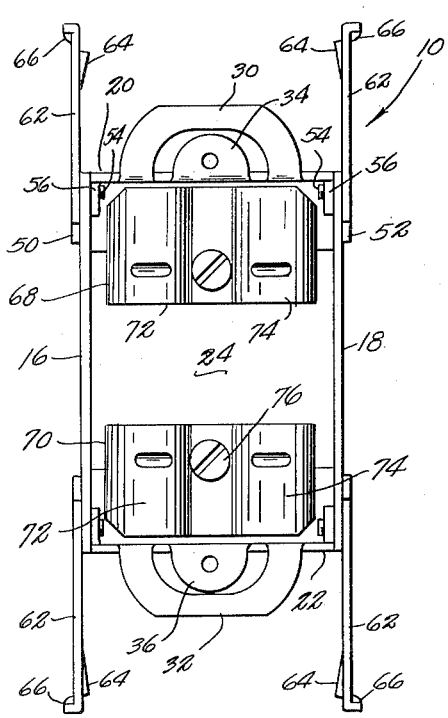
Figure 1 is a front elevational view of an outlet box embodying this invention before installation.

With continued reference to the drawings, the illustrated outlet box, generally indicated at 10, which is adapted to be inserted in an opening 12 cut into a wall 14 for the purpose of receiving the terminal ends of electrical conduits therein, which may be of the flexible type known variously in the trade as Romex, Flex, B. X. cable, etc., or may be of the rigid tube type simply referred to in the trade as "conduit."

The outlet box 10, which is open at its front, is of generally rectangular form and has a pair of spaced, parallel side walls 16 and 18, parallel top and bottom walls 20 and 22 extending between the side walls at opposite ends thereof, and a back wall 24 extending between the top and bottom walls and the side walls to close the rear of the box. The back wall 24 has oppositely beveled portions 26 and 28 at its upper and lower ends.

Oppositely and outwardly directed lateral flanges 30 and 32 are on front ends of the top and bottom walls, respectively, and are adapted to bear against the front of the wall, in opposition to the clamping means, as shown in Figure 6, and limit the inward movement of the box in the opening 12. Lugs 34 and 36 are also carried by the top and bottom walls respectively adjacent the open front of the box and are provided with threaded openings 35 by means of which a conventional electrical switch, not shown, may be secured within the box 10.

Figure 2:
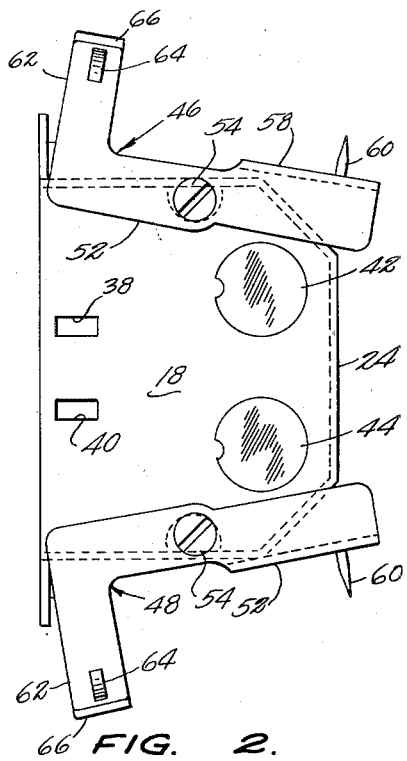
Figure 2 is a side elevational view thereof.
Figure 3:
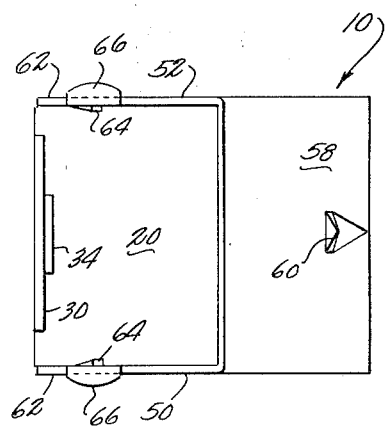
Figure 3 is a top plan view thereof.

The side walls 16 and 18 are provided with pairs of aligned, spaced, rectangular openings 38 and 40 adjacent the open front of the box, as clearly shown in Figure 2. Adjacent the back wall 24, the side walls 16 and 18 are provided with conventional partially stamped or pressed, knock-out discs 42 and 44 which may be easily removed by a sharp blow to provide electrical conduit inlet openings into the interior of the box 10.

Pivoted on the outer side of each box side wall is a pair of L-shaped clamping levers 46, 48. Each clamping lever comprises a long leg 50 and a short leg 52. Pivot screws 54 traverse intermediate portions of the long legs 50, the side walls, and thread into legs 56 on the top and bottom walls and located at the inner sides of the side walls. The pivots 54 are located close to the top and bottom walls 20, 22 and intermediate the front of the box and the back wall 24, and the pivots are aligned across the box.

A flat cross member 58 is integrally formed with and extends between the rear portions of the long legs 50 of each pair of clamping levers and is arranged to clampably bear against the back 13 of the wall 14 in the clamping positions of the levers, as shown in Figure 6. Triangularly shaped anchoring prongs 60, preferably struck out of the cross members 58 centrally intermediate their ends, project from the cross members and engage securably in the back of the wall in the clamping positions of the levers 46, 48.

The free ends of the short arms 52 are provided with inwardly projecting lugs 64 to define latches receivable in the box side wall openings 38 and 40 when the levers are moved to their clamping positions, as shown in Figure 6, to lock the levers therein.

The levers 46, 48 are made of flat sheet metal having inherent resilience biased against the outer surfaces of the respective side walls 16 and 18 which they overlie so that the lugs 64 are resiliently biased to enter the latch openings 38 and 40. The free ends of the short lever legs 52 terminate in lateral ears 55 to be used to flex the levers outwardly and remove the latch lugs 64 from the latch openings and permit movement of the levers to their inoperative positions whereby the box can be intentionally removed from the wall.

As the box 10 is inserted in the wall opening 12, the rear edges 63 of the short arms 52 of the respective clamping levers 46, 48 engage the front corners 15 of the wall opening 12 so that the levers 46, 48 are started toward their clamping positions. This rotation of levers 46, 48 continues until the flanges 30 and 32 bear against the front of the wall adjacent the opening 12. A tool may then be employed to continue the rotation of the levers in a counterclockwise direction, as viewed in Figure 5, to the clamping positions shown in Figure 6 wherein the latch lugs 64 engage in the latch openings 38 and 40 in the opposite side walls 16 and 18, and the sharp points 61 of the prongs 60 are embedded in the back 13 of the wall 14 so as to secure the box 10 in the opening. Thus, the box 10 will be secured in the wall opening against lateral shifting and against accidental removal. It is to be noted that installation of the box 10 is done without the use of tools, and without fastener means which have a tendency to work loose.

In the usual manner, the electrical conduits are led into the box through the openings 43 and 45. The electrical conduits are then connected to the usual switch commonly associated with an outlet box of this type. With the electrical conduits properly installed, and the box 10 secured in the wall 14, as shown in Figure 6, a pair of identical clamp plates 68 and 70 made of flat metal stock material, provided with spaced, longitudinal arched portions adjacent opposite ends thereof, are placed over the electrical conduits, the electrical conduits being led through the passages formed by the arches 72 and 74. A screw 76 is employed to secure each of the plates 68 and 70 to the beveled portions 26 and 28 respectively of the back wall 24, as seen in Figure 1, to prevent the electrical conduits from being accidentally displaced, after installation, and so as to avoid short circuits and the attendant dangers associated with such short circuiting. The beveled portions 26 and 28 are provided with suitably internally threaded openings to receive the screws 76 so that the plates 68 and 70 are removably secured within the box 10 in overlying relation to the electrical conduits disposed therewithin.

While there is shown and described the preferred embodiment of the invention, it is to be understood that the structure is susceptible to change and modification within the practicability of the invention and therefore should be limited only by the scope of the claims appended hereto.

What is claimed is:

1. In an electrical outlet box, a box having spaced side walls, clamping structure comprising a pair of levers pivoted intermediate their ends on said side walls, said levers having rear portions, and a cross member extending between and secured to said rear portions, said cross member being engageable with the back of a wall having an opening in which said box is to be positioned, said box having a front having lateral flange means thereon arranged to engage the front of the wall in opposition to said cross member.

2. In an electrical outlet box, a box having spaced side walls, clamping structure comprising a pair of levers pivoted intermediate their ends on said side walls, said levers having rear portions, and a cross member extending between and secured to said rear portions, said cross member being engageable with the back of a wall having an opening in which said box is to be positioned, said box having a front having lateral flange means thereon arranged to engage the front of the wall in opposition to said cross member, said cross member having a pointed prong arranged to be embedded in the back of the wall when said cross member is engaged with the back of the wall.

3. In an electrical outlet box, a box having an open front, side walls, top and bottom walls, and a back wall, said side walls having outer sides, a clamping lever pivoted intermediate its ends on the outer side of a side wall, lateral flange means on the front of the box arranged to bear against the front of a wall having an opening through which said box is to be mounted on the wall, and means on said lever for engaging the back of the wall in opposition to said flange means, said lever constituting a first lever pivoted on the side wall at a point close to said top wall, and a second lever similar to said first lever pivoted on the side wall near said bottom wall.

4. In an electrical outlet box, a box having an open front, side walls, top and bottom walls, and a back wall, said side walls having outer sides, a clamping lever pivoted intermediate its ends on the outer side of a side wall, lateral flange means on the front of the box arranged to bear against the front of a wall having an opening through which said box is to be mounted on the wall, and means on said lever for engaging the back of the wall in opposition to said flange means, said lever being L-shaped and comprising a long arm, pivot means traversing said long arm at a point intermediate the ends of the long arm and a side wall of the box and serving to pivot the lever on the side wall, said long lever arm having a rear end embodying said means and a front end, said lever further comprising a short arm on said front end of the long arm, said short arm extending at right angles to said long arm, said lever constituting a first lever pivoted on the side wall at a point close to said top wall, and a second lever similar to said first lever pivoted on said side wall at a point close to said bottom wall.

5. In an electrical outlet box, a box having spaced side walls, clamping structure comprising a pair of levers pivoted intermediate their ends on said side walls, said levers having rear portions, and a cross member extending between and secured to said rear portions, said cross member being engageable with the back of a wall having an opening in which said box is to be positioned, said box having a front having lateral flange means thereon arranged to engage the front of the wall in opposition to said cross member, said pair of levers constituting a first pair of levers, and a second pair of similar levers pivoted on the side walls in spaced relation to said first pair of levers, said second levers having rear portions, and a cross member extending between and secured to the rear portions of the second levers.

References Cited in the file of this patent
UNITED STATES PATENTS

| | | |
|---|---|---|
| 1,793,187 | Neall | Feb. 17, 1931 |
| 1,933,053 | Glattly | Oct. 31, 1933 |